United States Patent
Taniishi

Patent Number: 5,911,013
Date of Patent: Jun. 8, 1999

[54] CHARACTER RECOGNITION METHOD AND APPARATUS CAPABLE OF HANDLING HANDWRITING

[75] Inventor: Shinnosuke Taniishi, Kawasaki, Japan

[73] Assignee: Canon Kabushiki Kaisha, Tokyo, Japan

[21] Appl. No.: 08/868,809

[22] Filed: Jun. 4, 1997

Related U.S. Application Data

[63] Continuation of application No. 08/427,694, Apr. 24, 1995, abandoned, which is a continuation of application No. 08/104,769, Aug. 12, 1993, abandoned.

[30] Foreign Application Priority Data

Aug. 25, 1992 [JP] Japan .................................. 4-225956

[51] Int. Cl.$^6$ .................................................. G06F 15/332
[52] U.S. Cl. .......................................... 382/280; 382/190
[58] Field of Search ................................... 382/181, 182, 382/186, 187, 188, 189, 191, 276, 280; 395/707

[56] References Cited

U.S. PATENT DOCUMENTS

| | | | |
|---|---|---|---|
| 3,846,752 | 11/1974 | Nakano et al. | 340/146.3 |
| 3,909,785 | 9/1975 | Howells | 382/37 |
| 4,344,135 | 8/1982 | Crane et al. | 382/47 |
| 4,817,034 | 3/1989 | Hardin, Sr. et al. | 382/13 |
| 4,817,176 | 3/1989 | Marshall et al. | 382/43 |
| 5,046,116 | 9/1991 | Melen | 382/43 |
| 5,101,437 | 3/1992 | Plamondon | 382/122 |
| 5,108,206 | 4/1992 | Yoshida | 400/61 |
| 5,111,514 | 5/1992 | Ohta | 382/9 |
| 5,173,788 | 12/1992 | Ohta | 382/280 |
| 5,177,793 | 1/1993 | Murai et al. | 382/13 |
| 5,208,869 | 5/1993 | Holt | 382/159 |
| 5,315,668 | 5/1994 | O'Hair | 382/159 |
| 5,327,342 | 7/1994 | Roy | 382/13 |
| 5,463,696 | 10/1995 | Beernink et al. | 382/186 |
| 5,546,538 | 8/1996 | Cobbley et al. | 82/187 |
| 5,559,897 | 9/1996 | Brown et al. | 382/186 |
| 5,561,720 | 10/1996 | Lellmann et al. | 382/178 |
| 5,577,135 | 11/1996 | Grajski et al. | 382/253 |
| 5,610,996 | 3/1997 | Eller | 382/18 |

FOREIGN PATENT DOCUMENTS

| | | |
|---|---|---|
| 62-247485 | 10/1987 | Japan . |
| 4274550 | 9/1992 | Japan . |
| 2187873 | 9/1987 | United Kingdom . |

*Primary Examiner*—Joseph Mancuso
*Assistant Examiner*—Jayanii K. Patel
*Attorney, Agent, or Firm*—Fitzpatrick, Cella, Harper & Scinto

[57] ABSTRACT

An information processing apparatus and method which performs character recognition based on a character pattern inputted in a form of a handwritten character or coordinate data. A sample character registration unit stores feature data of a sample character pattern, and a feature extraction unit obtains feature information of the input character pattern from the input coordinate data by FFT. The coordinate data representing the input character pattern and the sample character pattern registered in the sample character registration unit are compared, and a sample character corresponding to the input character pattern is recognized. The sample character pattern is transformed and displayed in accordance with the characteristic of the input character pattern based on the feature information from the feature extraction unit.

21 Claims, 6 Drawing Sheets

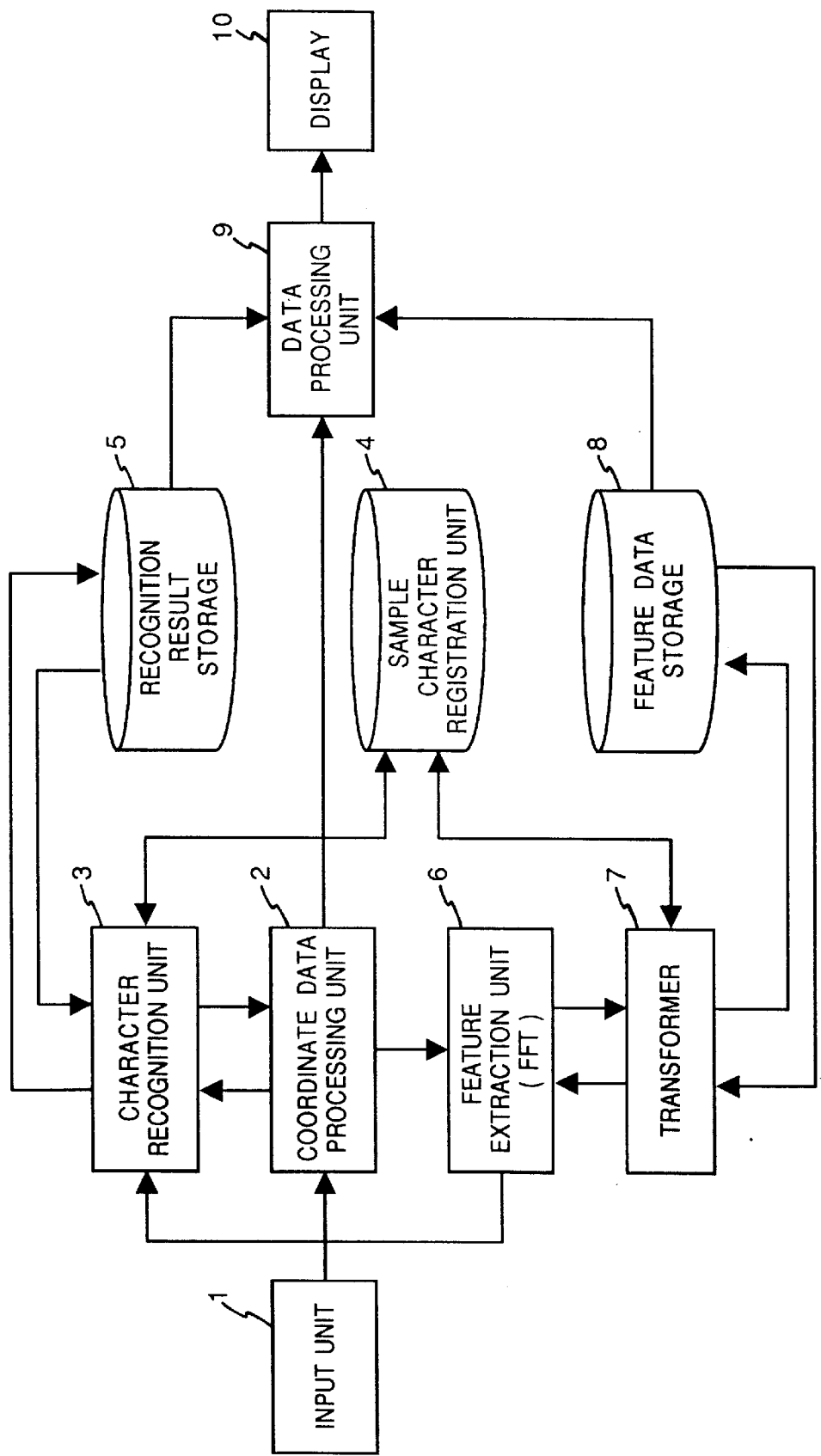

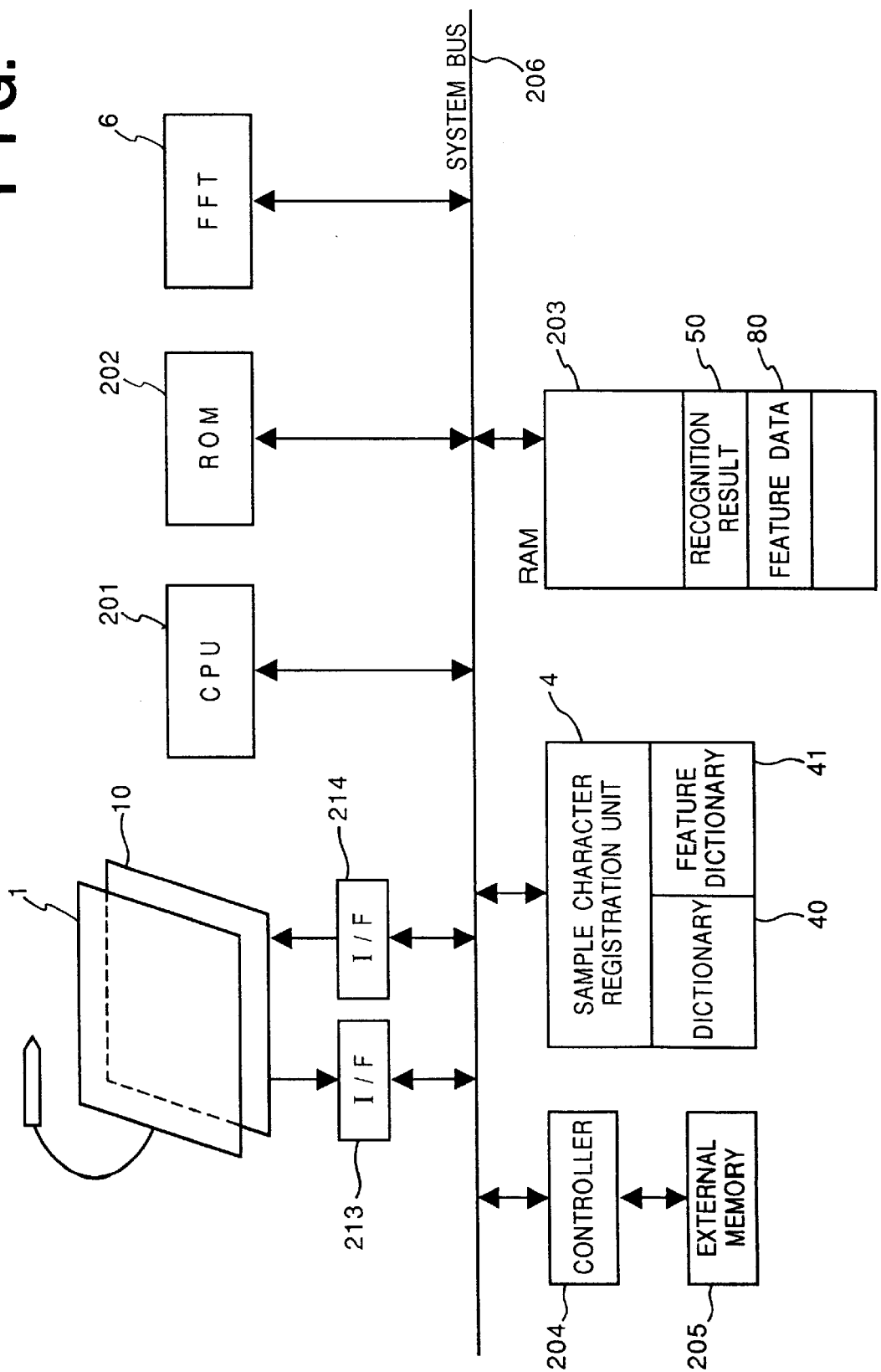

*patent*

FIG. 8B patent

FIG. 8C

*patent*

FIG. 8D

*patent*

CHARACTER RECOGNITION METHOD AND APPARATUS CAPABLE OF HANDLING HANDWRITING

This application is a continuation of application Ser. No. 08/427,694 filed Apr. 24, 1995, now abandoned, and application Ser. No. 08/104,769 filed Aug. 12, 1993, now abandoned.

BACKGROUND OF THE INVENTION

The present invention relates to an information processing method and apparatus thereof which processes various processings by using an input character pattern.

Conventional input apparatus for inputting handwritten character patterns and drawings to a processor such as a computer, a coordinate input apparatus using various input pens, tablets, and digitizers is well known. Information on character patterns and drawings inputted from such coordinate input apparatus is displayed on a display apparatus such as a liquid crystal display and CRT display, or outputted to a recording apparatus such as a printer. Furthermore, the coordinate information representing the input handwritten character pattern is stored or displayed as corresponding coordinate data.

However, when the coordinate data representing a character pattern is all stored, a massive amount of data needs to be stored. In order to reduce the data amount, the coordinate data is transformed to a character code by using a character recognition technique. However, the coordinate data representing an original handwritten character pattern cannot be reproduced from the character code transformed in this way. Therefore, it is not possible to output a particular character pattern, such as a handwritten one in its original appearance, once the original handwritten character pattern has been transformed to the character code.

It would be desirable to prevent the inconvenience which occurs if the information of the input handwritten character is all stored as coordinate data, as described earlier, because the amount of data is considerable and a large memory capacity is required, resulting in cost increase of the apparatus.

SUMMARY OF THE INVENTION

In light of the conventional technique, it is an object of the present invention to provide an information processing method and apparatus capable of recognizing a character from a handwritten character pattern inputted by an operator, and outputting the character pattern corresponding to the handwriting.

It is another object of the present invention to provide an information processing method and apparatus capable of avoiding the need to increase memory capacity, storing the input character pattern in a form of feature information, and outputting a character pattern corresponding to the operator's handwriting.

It is another object of the present invention to provide an information processing method and apparatus capable of recognizing a handwritten character pattern inputted by the operator, storing the recognized character as a code, and outputting the character pattern corresponding to the operator's handwriting when the character is to be read out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 1 is a block diagram illustrating a functional construction of a character input apparatus of an embodiment of the present invention;

FIG. 2 is a block diagram illustrating a general construction of the character input apparatus of the embodiment;

FIGS. 3A–3D respectively show the input character pattern, sample character pattern corresponding to the input character pattern, and the examples where the Fast Fourier Transform is applied to those patterns;

FIGS. 4A–4B respectively show an example of input character pattern, and an example of the character pattern where the input character pattern is multiplied by feature data;

FIGS. 5A–5B respectively show an example where the Fast Fourier Transform is applied to another character, and an example of the character pattern where the Fourier transformed character pattern is multiplied by feature data;

FIGS. 8A–8D respectively show the input character pattern, sample character pattern corresponding to the input character pattern, and the examples where the Fast Fourier Transform is applied to those patterns.

DESCRIPTION OF THE PREFERRED EMBODIMENTS

Figure 6:
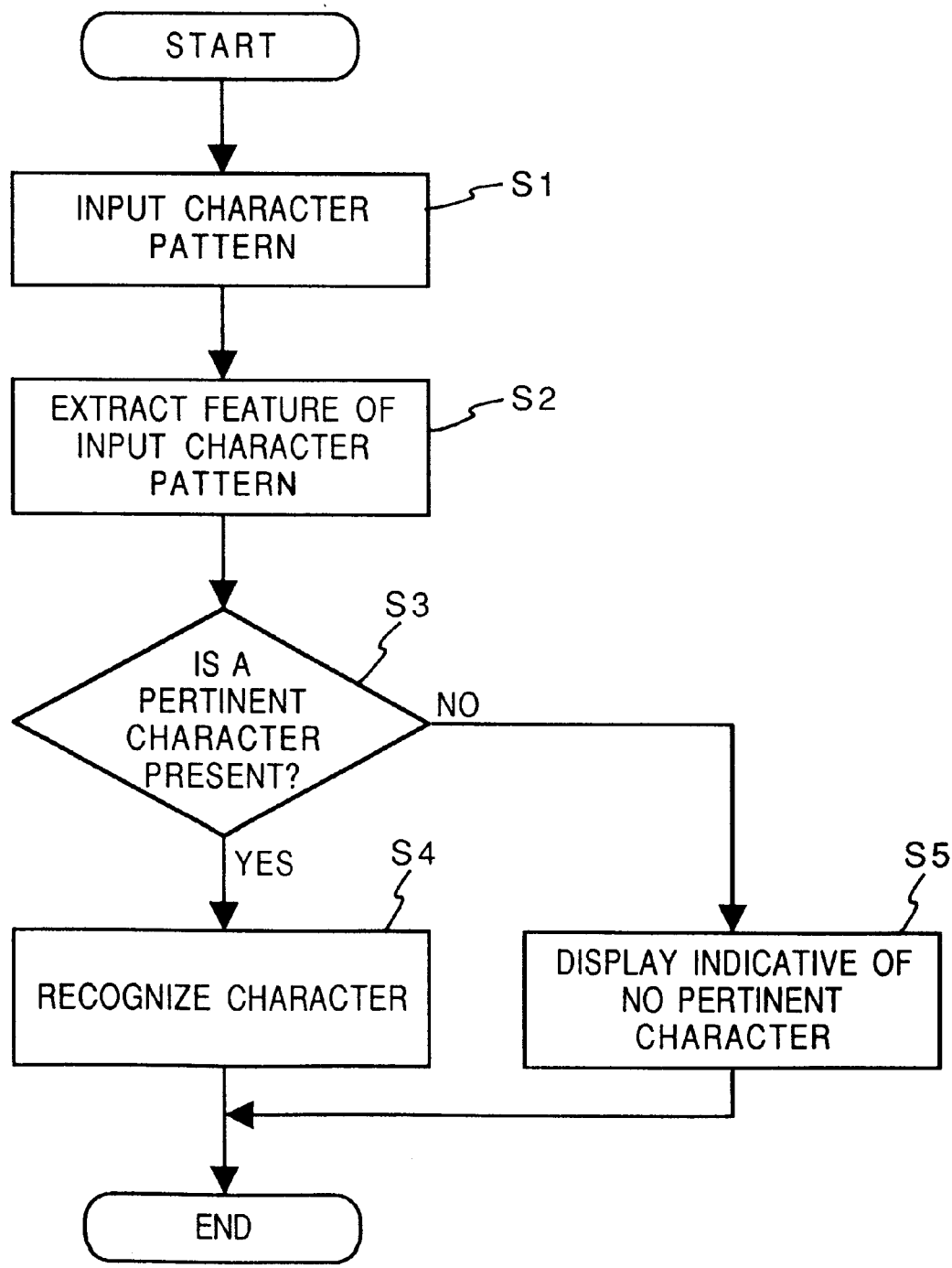
FIG. 6 is a flowchart illustrating the processing which inputs a character pattern in the character input apparatus and processes a character recognition based on the feature data.

The preferred embodiments of the present invention will now be described in detail in accordance with the accompanying drawings.

FIG. 1 is a block diagram illustrating a functional construction of a character input apparatus of an embodiment.

In FIG. 1, numeral 1 is a coordinate input unit such as a digitizer. An operator can input a handwritten character by using an input pen. Numeral 2 is a coordinate data processing unit which extracts coordinate information inputted in a character unit from the input unit 1 and outputs a set of the coordinate data. Numeral 3 is a character recognition unit which inputs the coordinate data from the coordinate data processing unit 2 and compares the coordinate data with reference character patterns stored in a sample character registration unit 4, recognizes the input character, and outputs the corresponding character code.

The sample character registration unit 4 includes a dictionary 40 storing the reference character patterns which are compared/referred during the character recognition by the character recognition unit 3, and a feature dictionary 41 (refer to FIG. 2) storing the feature information of handwriting from the input unit 1 which is extracted in a feature extraction unit 6 (to be described later) so as to correspond to each character pattern. Numeral 5 is a recognition result storage which stores code information illustrating the result of the character recognition unit 3. The feature extraction unit 6 extracts the feature of the coordinate information inputted from the input unit 1. For example, the input character information is subjected to spectrum analysis by using a Fast Fourier Transform (FFT), and high frequency component and low frequency components are outputted as feature data. Numeral 7 is a transformer which refers to a handwriting feature which is extracted from the feature extraction unit 6 and the feature dictionary 41 of the sample character registration unit 4, and the character pattern from the sample character registration unit 4 and the features of the operator's handwriting are matched. Numeral 8 is a feature data storage which stores the character pattern having a unique characteristic of the operator's handwriting which is determined in the transformer 7 in the form of feature data.

The information stored in the recognition result storage 5 and feature data storage 8 is displayed on a display 10 by a data processing unit 9, and via the data processing unit 9 which processes information such as commands, the information may be transmitted to a recording apparatus (not shown) or other terminal via a network.

With the above construction, the character pattern inputted by the operator from the input unit 1 is which character is determined, by referring to the feature dictionary 41 of the sample character registration unit 4, by using low frequency components obtained from the spectrum analysis in the feature extraction unit 6. On the other hand, the character information inputted by the input unit 1 is recognized by the character recognition unit 3, and the character is recognized. More detailed features on the determined character are obtained by using the high frequency components from the spectrum analysis and the features of the inputted character pattern are extracted. The extracted feature data $f_p$ is made to correspond to a character, and the unique character pattern for the operator is determined, and stored in the feature data storage 8.

FIG. 2 is a block diagram illustrating a general construction of the character input apparatus of the embodiment. The portions which are identical to FIG. 1 are indicated by the same reference numerals and the descriptions are not needed.

In FIG. 2, numeral 201 is a CPU which controls the overall apparatus, numeral 202 is a ROM which stores a control program of the CPU 201 and various data. Numeral 6 is a Fast Fourier transform (FFT) unit which performs feature extraction. In this embodiment, the FFT unit 6 comprises hardware; however, the transform can instead be executed by software. Numeral 205 is an external memory such as a floppy disk or hard disk which performs input/output of data with a system bus 206 via a controller 204. The input unit 1 is the coordinate input apparatus such as a digitizer having a transparent coordinate input panel. A display 10 is provided underneath a coordinate input surface of the input panel, and displays the character pattern inputted from the coordinate input surface and sample character patterns and so on. Numerals 213 and 214 are interfaces (I/F), each of which controls interfacing with the input unit 1 or the display 10. The RAM 203 is used as a work area of the CPU 201, and can temporarily store various data. In this embodiment, the recognition result 50 and the feature data 80 are stored in the RAM 203, however, the data can be stored in the external memory 205 such as a hard disk.

Furthermore, in this embodiment, control of the operation of the coordinate data processing unit 2, character recognition unit 3, transformer 7, and data processing unit 9 in FIG. 1 is executed by the control program stored in the ROM 202. However, these functions can be executed by a dedicated hardware circuit.

Figures 3A, 3B, 3C, 3D, 4A, 4B, 5A, 5B:
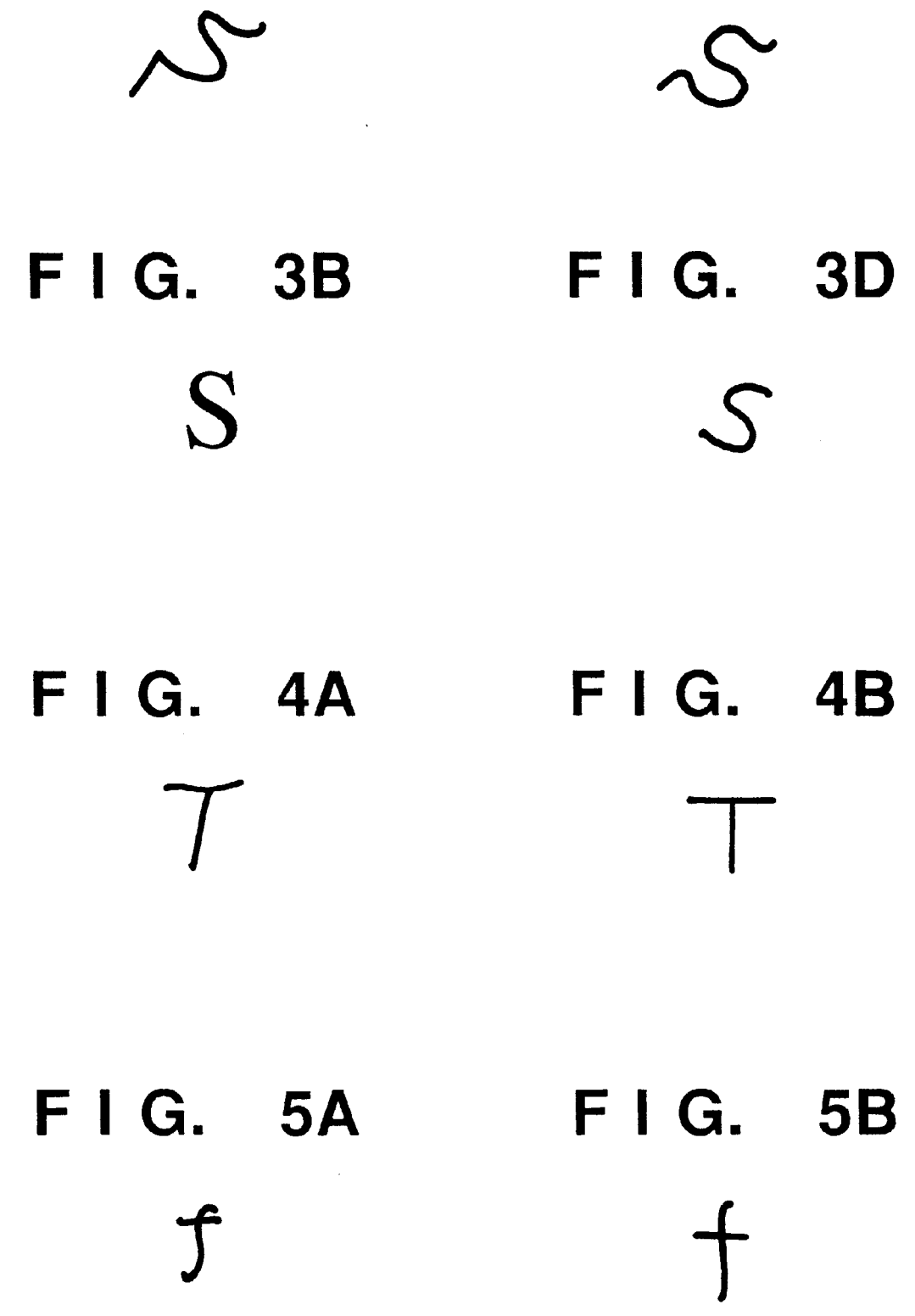

The general operation of the character input apparatus of the embodiment is described with reference to FIGS. 3A–5B.

FIG. 3A shows the handwritten character pattern of the character "S" which is inputted from the input unit 1 by the operator. FIG. 3B shows an example of the character pattern of the character "S" which is stored in the dictionary 40 of the sample character registration unit 4 as a sample character pattern. FIG. 3C shows the character pattern obtained using a result of Fast Fourier Transform of the input handwritten character "S" pattern shown in FIG. 3A. FIG. 3D shows the character obtained using a result of Fast Fourier Transform of the sample character "S" pattern shown in FIG. 3B. The feature data can be stored in the feature data 41 of the sample character registration unit 4.

FIG. 3C which shows the result when feature data obtained from the Fast Fourier Transform process of the input character pattern is compared with FIG. 3D which is the feature data obtained from the result of the Fast Fourier Transform process of the sample character (FIG. 3B). If they are similar, the input character pattern is determined as the character "S". In this case, the method for determining the character can be a vector recognition.

FIG. 4A and FIG. 4B show the example where feature pattern is extracted from the high frequency component obtained when sweep and curve of the character pattern which is unique to the operator (who input the character pattern shown in FIG. 3A) is subjected to spectrum analysis.

As similar to FIG. 3A, FIG. 4A shows the handwritten character pattern inputted by the input unit 1, and FIG. 4B shows the character pattern in which the feature is extracted in a form of the high frequency components through the spectrum analysis of the handwritten character pattern shown in FIG. 4A. The high frequency components representing the features are determined as feature data $f_p$ and these are stored in the feature data storage 8.

FIGS. 5A and 5B are an example where the feature data $f_p$ extracted in the feature extraction unit 6 is multiplied by the character pattern obtained in a manner such that the other sample character pattern in the dictionary 40 of the sample character registration unit 4 is subjected to the Fast Fourier Transform, and transformed to the character pattern having a unique feature of the operator's handwritten character pattern. Furthermore, when the feature data is stored in the feature data storage 8, it can be multiplied by the feature data $f_p$ directly.

FIG. 5A shows a transformed character pattern where the sample character pattern "f" is outputted from the dictionary 40 of the sample character registration unit 4, and the Fast Fourier Transform is performed on it by using the feature extraction unit 6. FIG. 5B shows the character pattern obtained by multiplying the Fourier transformed character pattern by the feature data $f_p$ extracted in the feature extraction unit 6. In this way, the character pattern corresponding to the operator's handwritten character pattern can be outputted from the sample character pattern. The obtained character pattern can be stored in the feature data storage 8.

FIGS. 3A–D show an example where extraction is performed in a character unit, but FIGS. 8A–D show an example where extraction is performed word by word. When a word is inputted in alphabetical character patterns, the data capacity of the dictionary increases, but features of an individual handwriting are extracted easier than the case of feature extraction a character by character. Furthermore, when the feature data $f_p$ is extracted from the character pattern of the input word, spelling can be checked at the same time.

FIG. 8A shows the character pattern of the word "patent" which is inputted from the input unit 1 by the operator. FIG. 8B shows an example of the character pattern of the word "patent" which is stored in the dictionary 40 of the sample character registration unit 4 as a sample character pattern. FIG. 8C shows the character pattern obtained in a manner such that the input word "patent" shown in FIG. 8A is subjected to the Fast Fourier Transform. FIG. 8D shows the character pattern obtained in a manner such that the sample character pattern "patent" shown in FIG. 8B is subjected to the Fast Fourier Transform. The feature data can be stored in the feature data 41 of the sample character registration unit 4.

The character recognition processing using the feature data is described with reference to FIG. 6. The control program which executes the processing is stored in the ROM 202.

At step S1, when a character pattern (handwritten character) is inputted from the input unit 1, the process proceeds to step S2 where a spectrum (feature data of the input character pattern) is extracted from the input character pattern. The feature data is stored in the feature data storage 8 of the ROM 203. Then, the process proceeds to step S3 where the feature data and the feature dictionary of the sample character registration unit 4 are compared, and it is determined whether or not a pertinent character is present. If there is the pertinent character, the process proceeds to step S4 where the determined character is outputted as a result of recognition. On the other hand, when the recognition cannot be executed at step S3, the process proceeds to step S5 where a message indicative of impossibility of character recognition or a list of candidate characters is outputted.

Figure 7:
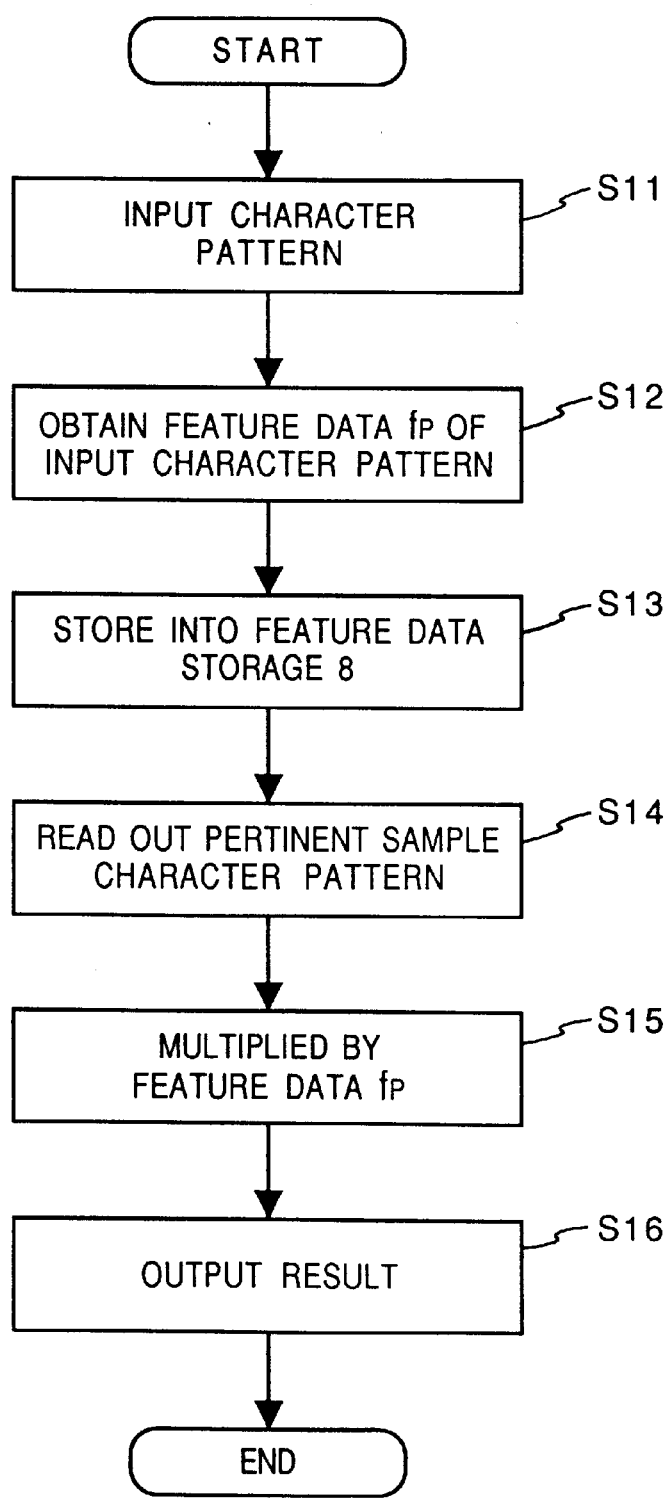
FIG. 7 is a flowchart illustrating an output processing of the character pattern which corresponds to the operator's handwriting from the sample character patterns in the character input apparatus.

FIG. 7 is a flowchart illustrating the processing to store the input character pattern in a form of feature data and display or output the character pattern showing the feature of the input character pattern. The control program which executes the processing is also stored in the ROM 202.

At step S11, a handwritten character pattern is inputted, and at step S12, the feature data $f_p$ of the character pattern is obtained. The feature data $f_p$ is stored in the feature data storage 8 of the RAM 203 (step S13). Then, the process proceeds to step S14 where a pertinent sample character pattern is read out from the sample character registration unit 4 in order to output the character in a character form inputted from the input unit 1 and the Fast Fourier Transform is performed on the sample character pattern. Subsequently, at step S15, the Fourier transformed data of the sample pattern is multiplied by the feature data $f_p$. Accordingly, as shown in FIG. 5B, the character pattern obtained by transforming the sample character pattern to correspond to the operator's handwriting can be obtained, and thus, an output in a desired character pattern is obtained.

As described above, according to this embodiment, storage and display/output in the character pattern having a unique feature of the operator's handwriting are possible simply by storing the code information which is obtained through the character recognition and the feature data thereof.

It is preferable to determine the feature in the feature extraction unit 6 using as much as data on the operator's handwriting by using a neural network and the like.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As described, according to the present embodiment, an apparatus capable of outputting the character pattern having the unique feature of the operator's handwriting can be provided without storing the coordinate data.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus which inputs a character pattern written by an operator and performs character recognition, comprising:

feature extraction means for extracting feature information peculiar to the operator from an input character pattern;

storage means for storing sample patterns of characters;

character recognition means for recognizing the input character pattern and for specifying a sample pattern corresponding to the input character pattern from among the sample patterns of said storage means; and transform means for obtaining a transform function based upon the feature information extracted by said feature extraction means, the feature information being peculiar to the operator with respect to the input character pattern, and for applying the transform function to the sample pattern corresponding to the input character pattern, as specified by said character recognition means, to transform the sample pattern into a character pattern peculiar to the operator.

2. The information processing apparatus according to claim 1, wherein said feature extraction means performs spectrum analysis on the input character pattern representing the operator's handwriting the and extracts first and second feature information.

3. The information processing apparatus according to claim 2, wherein said first feature information is formed by using low frequency components of the spectrum analysis.

4. The information processing apparatus according to claim 2, wherein said second feature information is formed by using high frequency components of the spectrum analysis.

5. The information processing apparatus according to claim 2, wherein said spectrum analysis is performed by a Fast Fourier Transform.

6. The information processing apparatus according to claim 2, wherein said character recognition means compares said first and second feature information of said sample character information stored in said storage means, and performs character recognition.

7. The information processing apparatus according to claim 2, wherein said transform means transforms the sample character pattern recognized by said character recognition means in accordance with said second feature information.

8. An information processing apparatus which inputs a character pattern written by an operator, comprising:

storage means for storing sample patterns of characters;

means for extracting feature information peculiar to the operator, obtained from high frequency components of an input character pattern written by the operator to which a spectrum analysis is applied, and for storing said feature information peculiar to the operator; and transform means for obtaining a transform function based upon the feature information, the feature information being peculiar to the operator with respect to the input character pattern, and for applying the transform function to the sample pattern corresponding to the input character pattern to transform the sample pattern into a character pattern peculiar to the operator.

9. The information processing apparatus according to claim 8, wherein the high frequency components are extracted based on high frequency components obtained by performing a Fast Fourier Transform on the input character pattern.

10. An information processing apparatus which performs character recognition based on a handwritten character pattern by an operator, comprising:

feature extraction means for obtaining feature information peculiar to the operator from a handwritten character pattern drawn by the operator;

storage means for storing reference character patterns of characters;

character recognition means for performing character recognition by comparing a reference character pattern and the feature information obtained by said feature extraction means, and for specifying a reference character pattern corresponding to the handwritten character; and transform means for transforming the reference character pattern specified by said character recognition means by applying a transform function based on the feature information obtained by said feature extraction means to the reference character pattern to transform the reference character pattern into a character pattern peculiar to the operator.

11. The information processing apparatus according to claim 10, wherein said feature information is high frequency components obtained from the handwritten character pattern to which the spectrum analysis is applied.

12. An information processing method comprising the steps of:

inputting a character pattern as coordinate data representing an operator's handwriting and obtaining feature information of the input character pattern, which is peculiar to the operator, from the coordinate data;

recognizing a corresponding sample character from the input coordinate data;

obtaining a transform function based upon the feature information;

transforming a character pattern of the sample character by applying the transform function to the character pattern of the sample character to transform the character pattern of the sample character to a character pattern peculiar to the operator based on the transform function, the transform function being peculiar to the operator with respect to the character pattern input by the operator; and displaying/outputting the transformed character pattern.

13. The information processing method according to claim 12, wherein said feature information is high frequency components of the input character pattern to which the spectrum analysis is applied.

14. An information processing method comprising the steps of:

inputting a character pattern as coordinate data representing an operator's handwriting, and obtaining a first and second feature information of an input character pattern represented by the coordinate data, the first and second feature information being peculiar to the operator;

recognizing a sample character corresponding to said coordinate data by comparing said first feature information and feature information of a character pattern of the sample character;

obtaining a transform function based upon the second feature information;

transforming the character pattern of said sample character by applying the transform function to the character pattern of said sample character to transform the character pattern of said sample character into a character pattern peculiar to the operator, based on the transform function, the transform function being peculiar to the operator with respect to the character pattern input by the operator; and displaying/outputting the transformed character pattern.

15. The information processing method according to claim 14, wherein said first feature information is low frequency components of the input character pattern to which the spectrum analysis is applied.

16. The information processing method according to claim 14, wherein said second feature information is high frequency components of the input character pattern to which the spectrum analysis is applied.

17. A computer-readable memory medium storing computer-executable process steps, the steps comprising:

an inputting step to input a character pattern as coordinate data representing an operator's handwriting;

an obtaining step to obtain feature information of the input character pattern, which is peculiar to the operator, from the coordinate data;

a recognizing step to recognize a corresponding sample character from the input coordinate data;

an obtaining step to obtain a transform function based upon the feature information;

a transforming step to transform a character pattern of the sample character by applying the transform function to the character pattern of the sample character to transform the character pattern of the sample character to a character pattern peculiar to the operator based on the transform function, the transform function being peculiar to the operator with respect to the character pattern input by the operator; and a displaying/outputting step to display/output the transformed character pattern.

18. A computer-readable memory medium storing computer-executable process steps according to claim 17, wherein the feature information are high frequency components of the input character pattern to which a spectrum analysis is subsequently applied.

19. A computer-readable memory medium storing computer-executable process steps, the steps comprising:

an inputting step to input a character pattern as coordinate data representing an operator's handwriting;

an obtaining step to obtain a first and a second feature information of an input character pattern represented by the coordinate data, the first and the second feature information being peculiar to the operator;

a recognizing step to recognize a sample character corresponding to said coordinate data by comparing the first feature information and feature information of a character pattern of the sample character;

an obtaining step to obtain a transform function based upon the second feature information;

a transforming step to transform the character pattern of said sample character by applying the transform function to the character pattern of said sample character to transform the character pattern of said sample character into a character pattern peculiar to the operator, based on the transform function, the transform function being peculiar to the operator with respect to the character pattern input by the operator; and a displaying/outputting step to display/output the transformed character pattern.

20. A computer-readable memory medium storing computer-executable process steps according to claim 19, wherein the first feature information consists of low frequency components of the input character pattern to which a spectrum analysis is subsequently applied.

21. A computer-readable memory medium storing computer-executable process steps according to claim 19, wherein the second feature information consists of high frequency components of the input character pattern to which a spectrum analysis is subsequently applied.

* * * * *

UNITED STATES PATENT AND TRADEMARK OFFICE
CERTIFICATE OF CORRECTION

PATENT NO. : 5,911,013

DATED : June 8, 1999

INVENTOR : Shinnosuke Taniishi

It is certified that error appears in the above-identified patent and that said Letters Patent is hereby corrected as shown below:

COVER PAGE

Under [56] References Cited, Foreign Patent Documents, "4274550" should read --4-274550--.

COLUMN 4

Line 28, "As similar" should read --Similar--.

COLUMN 6

Line 35, "the" (second occurrence), should be deleted.

COLUMN 8

Line 46, "are" should read --is--.

Signed and Sealed this

Seventh Day of December, 1999

Attest:

Q. TODD DICKINSON

*Attesting Officer*    *Acting Commissioner of Patents and Trademarks*